United States Patent [19]

Stoychoff

[11] 4,153,087

[45] May 8, 1979

[54] ACCUMULATOR MECHANISM FOR TREE HARVESTING APPARATUS

[75] Inventor: Terry A. Stoychoff, Schofield, Wis.

[73] Assignee: J. I. Case Company, Racine, Wis.

[21] Appl. No.: 905,136

[22] Filed: May 12, 1978

[51] Int. Cl.² ............................................. A01G 23/08
[52] U.S. Cl. ................................. 144/34 E; 144/3 D; 294/106
[58] Field of Search ............... 144/2 Z, 3 D, 34 R, 144/34 E, 309 AC; 214/3, 147 G; 294/106, 88; 83/102.1, 928

[56] References Cited

U.S. PATENT DOCUMENTS

| 3,664,391 | 5/1972 | Coffey | 144/34 R |
| 3,795,264 | 3/1974 | Coughran, Jr. | 144/34 R X |
| 3,805,860 | 4/1974 | Smith | 144/309 AC X |
| 3,910,326 | 10/1975 | Tucek | 144/34 R |
| 3,911,981 | 10/1975 | Tucek | 144/34 E X |

*Primary Examiner*—Donald R. Schran
*Assistant Examiner*—W. D. Bray
*Attorney, Agent, or Firm*—Dressler, Goldsmith, Clement, Gordon & Shore, Ltd.

[57] ABSTRACT

An accumulator arm for use with a harvesting apparatus having support means with grapple means and cutter means on the support means consists of first and second portions which are pivotally interconnected and are normally biased to an end-to-end relation. The biasing means consists of a flexible member entrained over a sleeve forming part of the pivotal connection with first and second spring means interposed between opposite ends of the flexible member and the respective portions of the arm.

6 Claims, 4 Drawing Figures

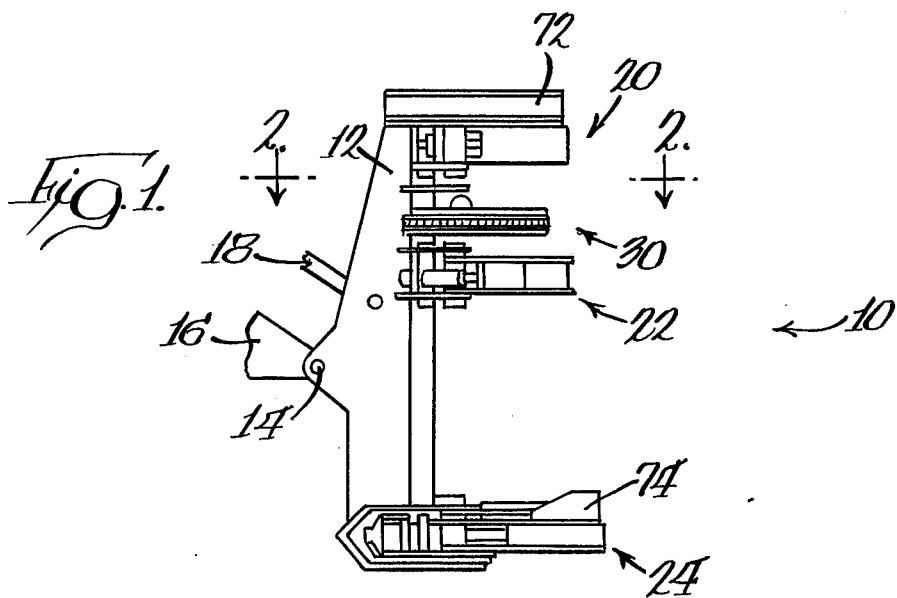
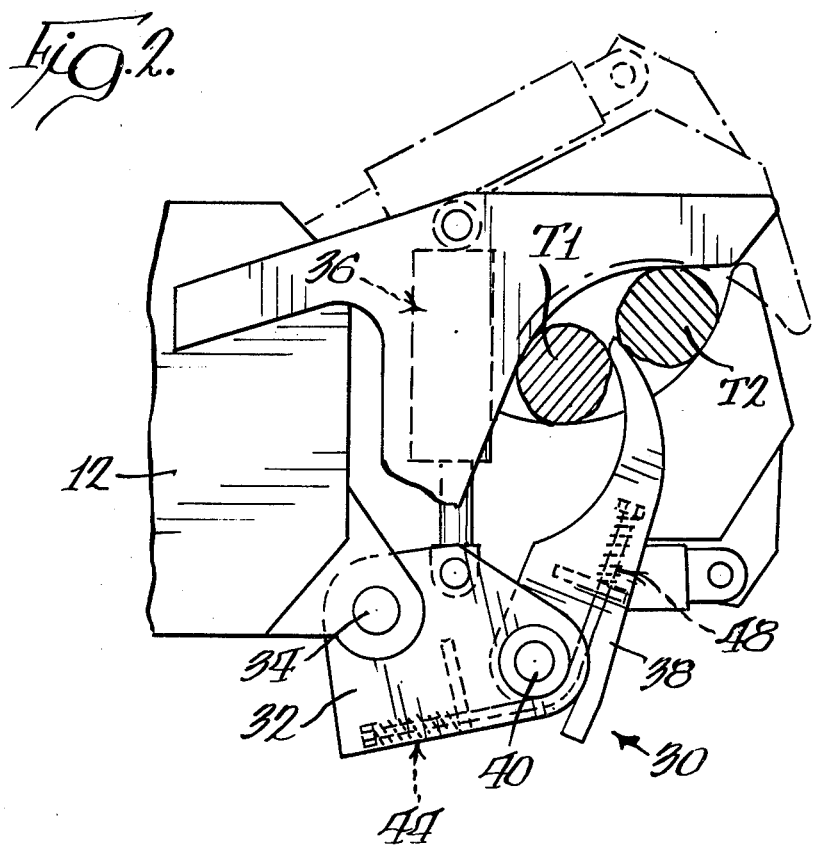

4,153,087

ACCUMULATOR MECHANISM FOR TREE HARVESTING APPARATUS

REFERENCE TO RELATED PATENT

This application relates to an improvement for tree cutting apparatus of the type disclosed in U.S. Pat. No. 3,910,326, which is incorporated herein by reference.

BACKGROUND OF THE INVENTION

The dwindling supply of labor has resulted in substantial attention being directed to the harvesting of trees by mechanical means. One of the more popular machines that is presently being utilized for this purpose is a feller-buncher which generally consists of a head that is mounted on the end of a conventional boom and dipper stick assembly which is pivotally supported on a turntable of a vehicle. The feller head includes grapple means for grasping a tree and cutter means for severing the tree adjacent the ground.

In order to increase the versatility of these machines and, therefore, the productivity thereof, some felling heads are capable of cutting and retaining a plurality of trees prior to depositing them on the ground. For example, the above-mentioned Tucek patent discloses a single accumulator arm that cooperates with vertically spaced fixed tree engaging elements on the support and the accumulator arm is pivoted on the support between first and second positions. The accumulator arm consists of first and second portions that are pivotally interconnected between adjacent ends thereof and are normally biased to an end-to-end position by biasing means normally maintaining the portions of the accumulator arm in end-to-end position while accommodating pivotal movement relative to each other. While such an accumulator device has been found to perform the required function of collecting trees, the overall size of the biasing mechanism and the degree of difficulty of assembling the unit have resulted in substantial cost for such an assembly.

SUMMARY OF THE INVENTION

According to the present invention, a simplified tree accumulator means similar to the type disclosed in the above-mentioned patent reduces the difficulty for assembling the unit and reduces the size of the biasing springs that are necessary for the accumulator arm, both of which reduce the overall cost of the accumulator arm.

The biasing mechanism of the present invention consists of a flexible element or chain entrained over the pivotal connection between first and second portions of the accumulator arm with first and second spring means respectively interposed between opposite ends of the flexible element and the respective portions of the accumulator arm. More specifically, each spring means includes a rod that has one end secured to an adjacent end of the flexible element and an opposite threaded end. A spring is telescoped onto the rod and has one end in engagement with an abutment on the associated portion of the collector or accumulator arm and an opposite end in engagement with a threaded member received on the free end of the rod. One significant advantage of utilizing separate spring means over the prior art unit disclosed in the above-mentioned patent is that the total relative motion between the primary and secondary or first and second portions is divided between two short springs which allows the overall size for a portion of the arm pivoted on the feller head support to be reduced and simplifies pretensioning of the spring means. Utilization of the twin springs also reduces the number of parts required for performing the biasing function.

According to another aspect of the invention, the pivotal connection between the primary and secondary portions of the accumulator arm consists of a pin and a sleeve rotatable on the pin with the intermediate portion of the flexible element secured to the rotatable element for movement therewith. The interconnection between the flexible element or chain and the sleeve will eliminate chain wear during relative pivotal movement of the primary and secondary portions of the accumulator arm.

BRIEF DESCRIPTION OF THE SEVERAL VIEWS OF THE DRAWINGS

FIG. 1 of the drawings discloses a fragmentary view of a tree harvester apparatus with certain portions of the vehicle and the boom being deleted for simplicity;

FIG. 2 is an enlarged sectional view, as viewed generally along line 2—2 of FIG. 1;

DETAILED DESCRIPTION

Figure 3:
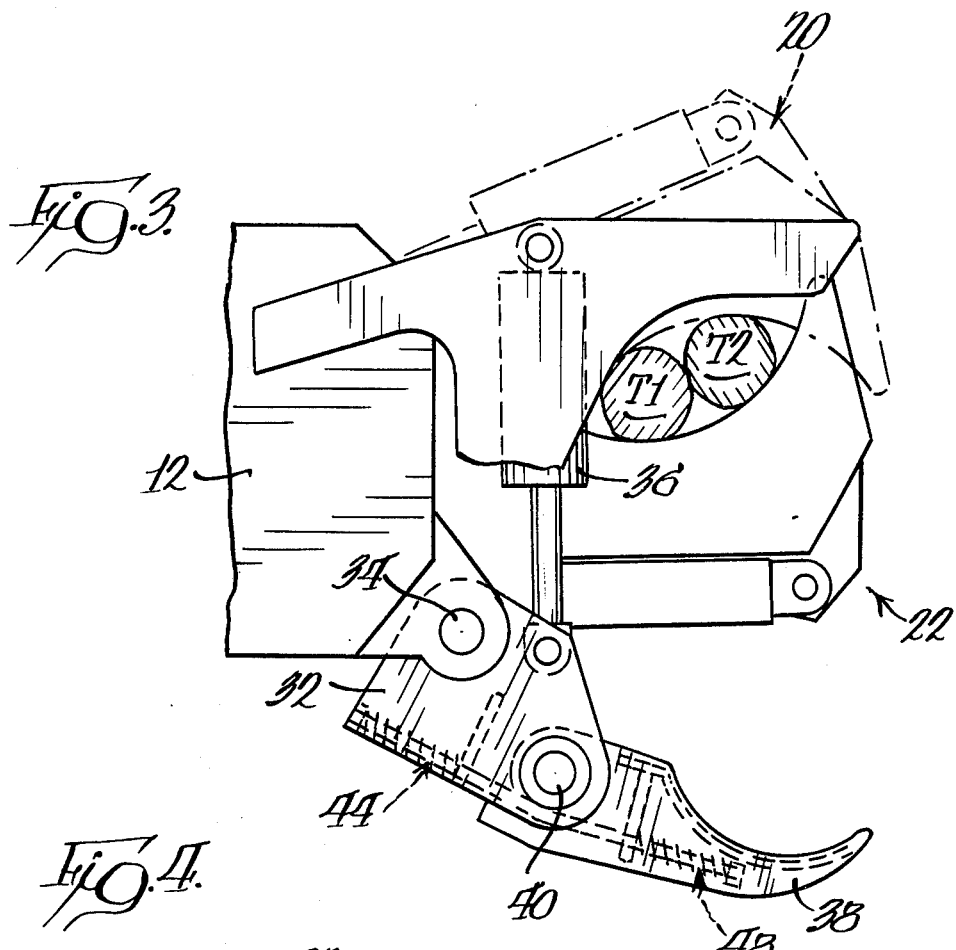
FIG. 3 is a view similar to FIG. 2 showing the accumulator arm portions in their normal end-to-end position.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses a tree harvester apparatus generally designated by reference numeral 10. The majority of the harvesting apparatus 10 is substantially identical to that disclosed in U.S. Pat. No. 3,910,326 and consists of a rigid support means 12 pivotally supported by a pin 14 on the outer end of a boom 16 which may be part of a mobile crane (not shown). Support means 12 may be pivoted on the end of boom 16 through a fluid ram 18. Tree harvesting apparatus or feller-buncher head 10 includes an upper grab arm assembly 20, an intermediate grab arm assembly 22 and a lower tree engaging and shearing assembly 24.

A tree accumulator means 30 is supported on support means 12 and is located between the respective grab arm assemblies 20 and 22. Tree accumulator means or arm 30 is illustrated in further detail in FIGS. 2-4 and includes a first or primary portion 32 that is pivoted on support means 12 through a pin 34. The primary or first portion of accumulator arm 30 is pivoted between first and second positions respectively indicated in FIGS. 2 and 3 through a fluid ram 36 interposed between a fixed portion of support 12 and primary portion 32. Accumulator arm 30 also includes a second portion 38 having one end pivotally connected to a free end of primary portion 32 through a pivot pin 40. The second or secondary portion 38 of accumulator arm 30 is normally biased to a position illustrated in FIG. 3 through biasing means which will now be described in connection with FIG. 4.

The biasing means consists of a flexible element or chain 42 that has an intermediate portion entrained over pivot pin 40 and has first and second spring means 44 and 48 respectively interposed between opposite ends of flexible chain 42 and the respective portions 32 and 38 of accumulator arm 30. Since the respective spring means are identical in construction only one will be described in connection with FIG. 4.

Each spring means consists of a rod 50 having one end pivotally connected through a pivot pin 52 to an adjacent end of flexible chain 42. Rod 50 extends through an opening 54 in an abutment 56 that is fixedly secured to an associated portion of the accumulator arm. The outer free end of rod 50 is threaded at 58 and receives a threaded member or nut 60. A spring 62 has one end in engagement with abutment 56 and an opposite end in engagement with threaded member 60 with washers 64 respectively interposed therebetween.

Figure 4:
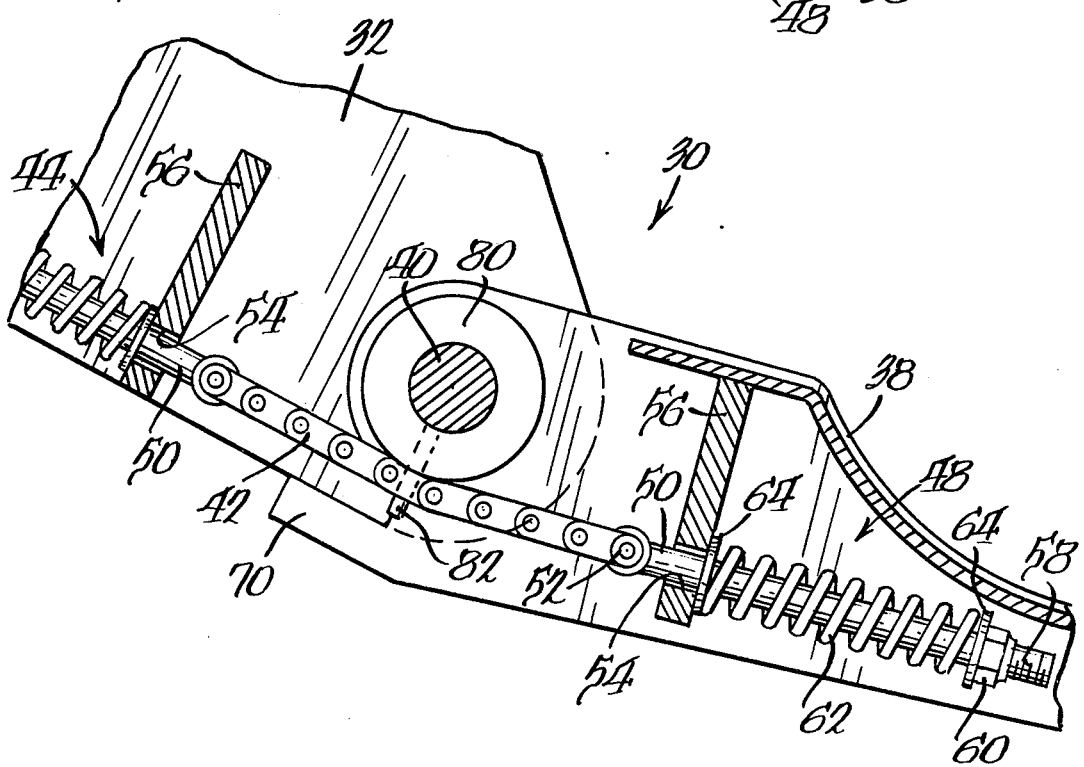
FIG. 4 is an enlarged fragmentary sectional view of the intermediate portion of the accumulator arm.

With the arrangement so far described, the biasing means, including first and second spring means 44 and 48, normally maintain the primary and secondary portions 32 and 38 of accumulator arm 30 in the position illustrated in FIGS. 3 and 4, wherein the portions of the arm are in generally end-to-end relation, defined by a stop 70 on second portion 38 which engages an adjacent surface on first portion 32. The accumulator arm is maintained in this position while being pivoted about pivot pin 34 through fluid ram 36 when a first tree T1 is being held by the accumulator arm into engagement with vertically spaced fixed tree engaging elements 72 and 74 respectively located adjacent the upper and lower ends of support means 12. However, when a second tree T2 is gripped between grab arm assemblies 20 and 22 and is severed by cutting means 24, the accumulator arm is clamped between trees T1 and T2. Thus, the biasing means will accommodate pivotal movement of secondary arm portion 38 about pivot pin 40 to the position illustrated in FIG. 2. In this position, fluid ram 36 can be actuated to pivot primary portion 32 about pivot pin 34 so that the free end portion of secondary portion 38 is withdrawn from between two trees T1 and T2 while both trees are gripped by grab arm assemblies 20 and 22. After the free end of secondary arm portion 38 is free of both trees T1 and T2, the biasing means including first and second spring means 44 and 48 will automatically cause the accumulator arm to assume the end-to-end position illustrated in FIG. 3 so that fluid ram may be actuated and pivot the two portions 32 and 38 as a unit about pivot pin 34 and grip both trees T1 and T2 between fixed contact elements 72 and 74.

According to another aspect of the invention, wear of the flexible element or chain 42 is eliminated by utilizing a sleeve 80 which is rotatably supported on the pivotal interconnection or pin 40 between portions 32 and 38. An intermediate portion of flexible element 42 is connected to sleeve or boss 80 through a further pin 82 so that the intermediate portion of the chain moves with sleeve 80. Thus, any wear that might result from relative movement of chain 42 with respect to pin 40 will be absorbed within sleeve 80 rather than the more vulnerable and more expensive chain 42.

Summarizing the above invention, the use of two spring assemblies respectively associated with the primary and secondary arms allows the springs to be much smaller which reduces the overall size of the accumulator arm, particularly the primary portion which is pivoted on the support means. A further advantage is that, by having the rods longer than the unstressed condition of the respective springs 62, the springs can readily be telescoped onto the rods 50 and can be pretensioned by appropriate adjustment of threaded members or nuts 60. The respective springs, therefore, can be substantially shorter and smaller than the single spring as disclosed in the above-mentioned Tucek patent. Also, interconnecting sleeve 80 with an intermediate portion of chain 42 will eliminate any wear of the chain during the pivotal movement of the respective portions of the arm.

What is claimed is:

1. In a tree harvesting apparatus having support means, grapple means and cutter means on said support means, and accumulator means on said support means, said accumulator means including first and second spaced tree engaging elements fixed to said support and an accumulator arm having one end pivoted on said support between said tree engaging elements, said accumulator arm including a first portion having one end pivoted on said support means with a second portion pivotally connected to the free end of said first portion and biasing means normally maintaining said portions in end-to-end relation and accommodating pivotal movement about the pivotal connection, said biasing means including a flexible element having an intermediate portion entrained over the pivotal connection, first spring means between said first portion and one end of said flexible element and second spring means between said second portion and the opposite end of said flexible element.

2. Tree harvester apparatus as defined in claim 1, in which each spring means includes a rod having one end connected to said flexible element with a spring telescoped over said rod, and a threaded member received on the opposite end of each rod and engaging one end of said spring; and a fixed abutment on each portion with an opposite end of each spring engaging an abutment of an associated portion.

3. Tree harvester apparatus as defined in claims 1 or 2, in which said pivotal connection includes a pin interconnecting said portions with a sleeve rotatably supported on said pin further including means for connecting said intermediate portion of said flexible element to said sleeve.

4. An accumulator arm for use with a tree harvesting apparatus including first and second elongated portions pivotally interconnected with biasing means normally maintaining said portions in end-to-end relation, the improvement of said biasing means including a flexible element having an intermediate portion entrained over the pivotal interconnection, first and second spring means respectively interposed between opposite ends of said flexible element and said first and second portions for normally maintaining said portions in end-to-end relation and accommodating pivotal movement of said portions about the pivotal interconnection.

5. An accumulator arm as defined in claim 4, in which the pivotal connection between said first and second portions includes a pin and a sleeve rotatably supported on said pin, further including means for interconnecting said intermediate portion of said flexible element and said sleeve.

6. An accumulator arm as defined in claim 5, in which each of said first and second portions has an abutment fixed thereto with an opening therein, and each spring means includes a rod having one end connected to an associated end of said flexible member and extending through an opening in an associated abutment with the opposite end having a threaded member received thereon and a spring telescoped on said rod and having one end in engagement with an associated abutment and an opposite end in engagement with an associated threaded member.

* * * * *